United States Patent [19]

Nolff

[11] Patent Number: 4,519,347
[45] Date of Patent: May 28, 1985

[54] BRACKET FOR SUPPORTING LOW PRESSURE GAS CARBURETOR AND COMPONENTS

[75] Inventor: Robert L. Nolff, Romulus, Mich.

[73] Assignee: Propane Carburetion Company, Inc., Romulus, Mich.

[21] Appl. No.: 521,716

[22] Filed: Aug. 9, 1983

Related U.S. Application Data

[63] Continuation of Ser. No. 351,019, Feb. 22, 1982, abandoned.

[51] Int. Cl.³ .............................................. F02F 7/00
[52] U.S. Cl. .................................. 123/195 A; 123/557
[58] Field of Search ............... 123/195 R, 195 A, 525, 123/527, 557, 198 R

[56] References Cited

U.S. PATENT DOCUMENTS 3,110,296 11/1963 Lundi .................................... 123/557
3,919,995 11/1975 Todd ................................. 123/195 A
4,159,698 7/1979 Berenbaum ......................... 123/557

Primary Examiner—Craig R. Feinberg
Attorney, Agent, or Firm—Charles W. Chandler

[57] ABSTRACT

A bracket for mounting a carburetor, a low pressure gas converter, and a fuel filter on an engine. The bracket has a flange fastened in a sandwiched position between the carburetor and the intake manifold.

4 Claims, 5 Drawing Figures

BRACKET FOR SUPPORTING LOW PRESSURE GAS CARBURETOR AND COMPONENTS

This is a continuation, of application Ser. No. 351,019, filed Feb. 22, 1982 now abandoned.

BACKGROUND OF THE INVENTION

This invention is related to a low pressure gas conversion unit for automotive vehicles, and more particularly to a bracket for supporting a carburetor, a propane gas converter, and a fuel filter on an engine, all supported on a bracket fastened on the intake manifold of the engine between the carburetor and the intake manifold opening.

Many automotive vehicles, such as buses, trucks, and fleet vehicles are being converted to use low pressure gas, such as propane. The conversion process involves changing the gasoline carburetor for a mixer or carburetor for propane gas and air, and mounting a converter unit which reduces the pressure of the gas from the gas tank by means of a hot water connection, and mounting a filter unit that operates on engine vacuum. The fuel mixer or gas carburetor is fastened on the intake manifold adjacent the intake manifold opening.

The converter and the fuel filter are conventionally mounted in various locations in the engine housing with relatively long hoses connecting these two units to the carburetor. There is no standard method for mounting these units, the particular location depending upon the mechanic making the conversion. The converter and the fuel filter means cannot be readily mounted on the manifold because there is no location suitable for attaching these devices.

SUMMARY OF THE INVENTION

The broad purpose of the present invention is to provide a one-piece bracket having a flange that is sandwiched between the carburetor and the intake manifold with fastener openings aligned with the original tapped openings in the manifold used for mounting the original gasoline carburetor. The flange has an opening for passing a fuel-air mixture from the carburetor to the engine, and a pair of mounting plates integrally connected to the bracket body for supporting the converter and the fuel filter adjacent the carburetor. Preferably the bracket is formed of a one-piece metal casting so that the carburetor, the fuel filter and the converter can all be removed from or installed on the engine as a unit.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
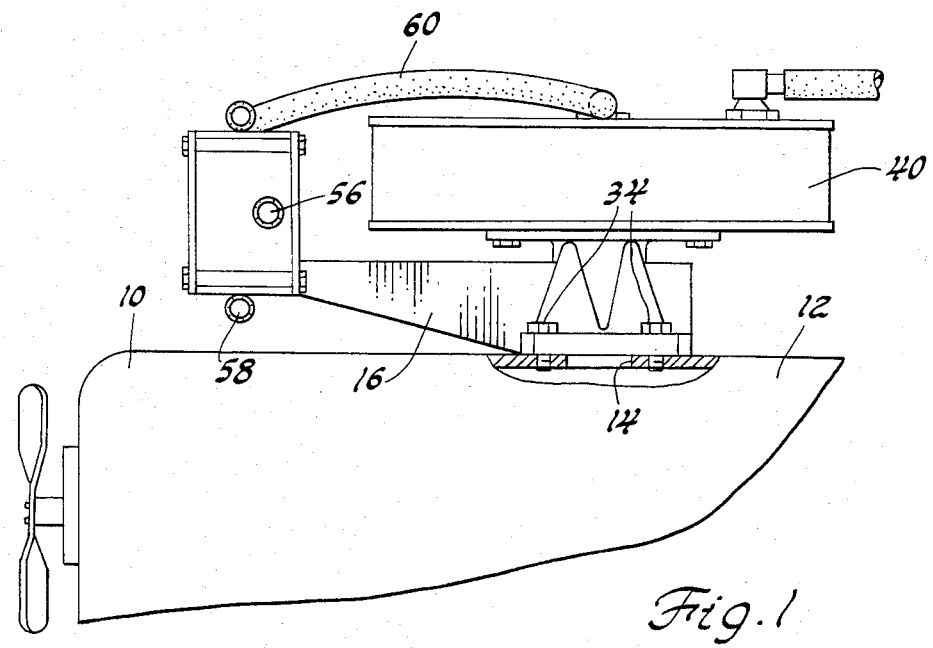
FIG. 1 is an elevational view of a bracket supporting a propane gas carburetor, a converter, and a fuel filter on an internal combustion engine.
Figure 2:
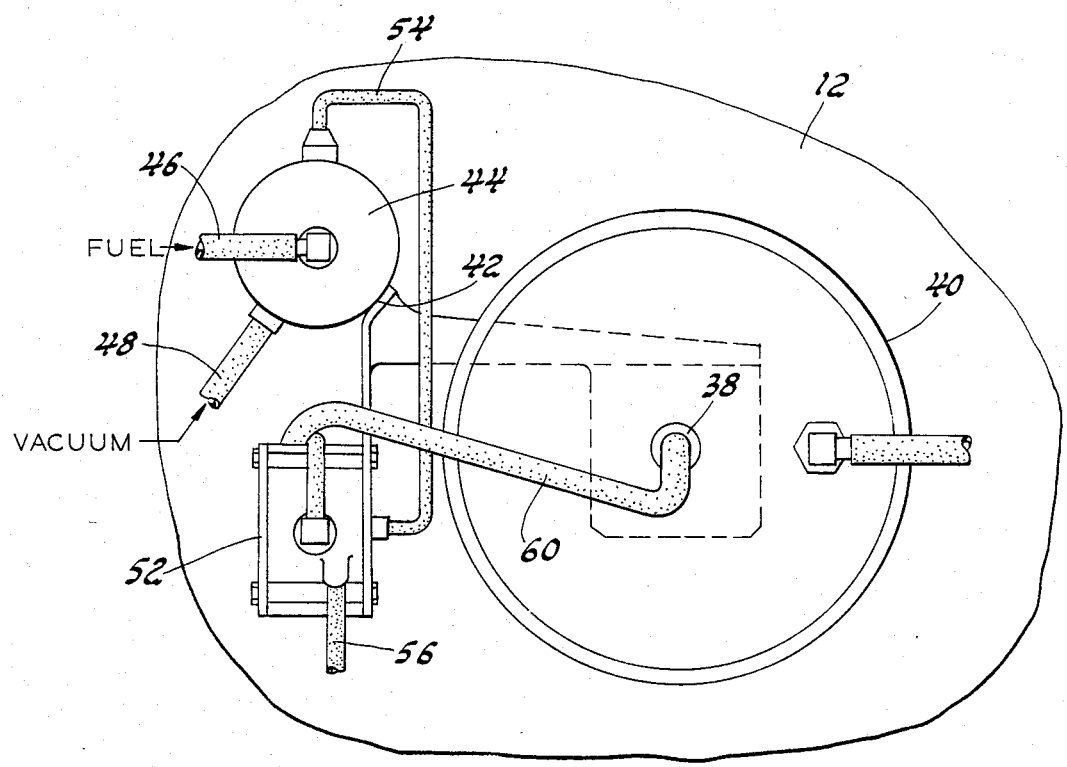
FIG. 2 is a plan view of the apparatus of FIG. 1.

Referring to the drawings, a conventional internal combustion engine 10 is illustrated in FIG. 1. Engine 10 has an intake manifold 12 having an opening 14 for receiving a combustible fuel-air mixture. A one-piece bracket 16 is mounted on the intake manifold.

Figure 3:
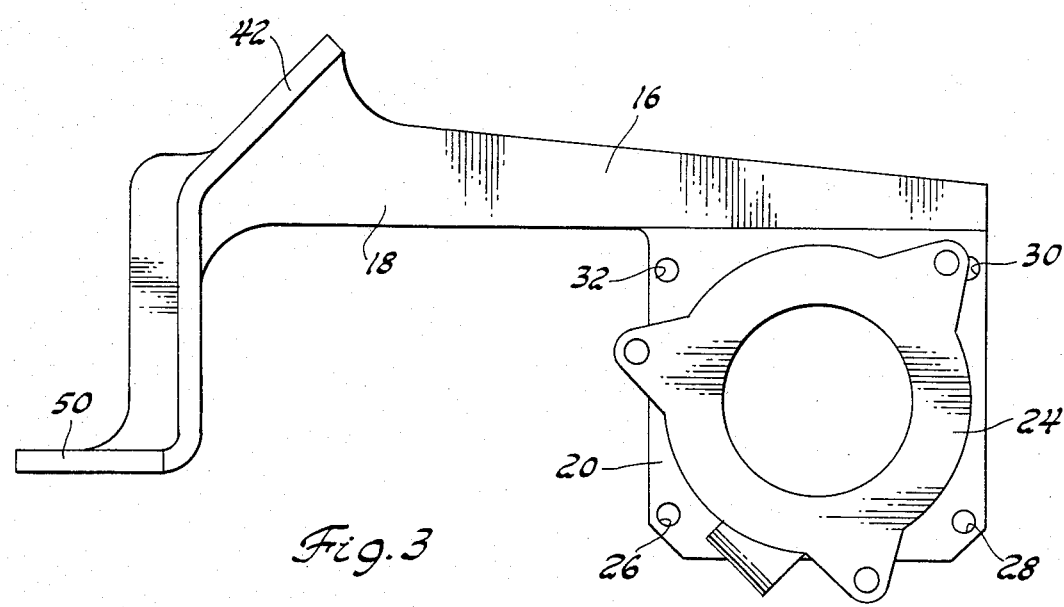
FIG. 3 is a plan view of the bracket separated from the engine and the carburetor components.
Figure 4:
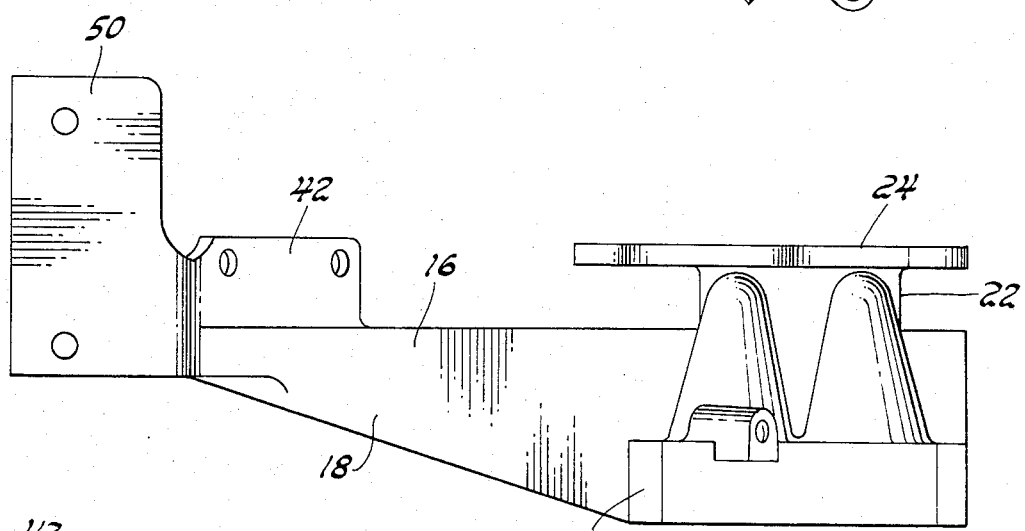
FIG. 4 is an elevational view of the bracket.

As best illustrated in FIGS. 3 and 4, bracket 16 has an elongated body 18. A generally square flange 20 has one edge integrally attached adjacent one end and on one side of body 18 and is at right angles to the flat side of the body. A throat 22 is integrally attached to the upper side of flange 20. An upper flange 24 is integrally mounted on the upper edge of the throat, parallel to lower flange 20.

Lower flange 20 has four openings 26, 28, 30, and 32 adapted to receive fastener means 34 in the same openings in the intake manifold formed to fasten the original equipment gasoline carburetor.

For illustrative purposes, a Model C 300A Series 50 Carburetor 38, manufactured by Impco Carburetion, Inc. is mounted on flange 24. An air cleaner 40 is mounted on carburetor 38.

A mounting plate 42 on body 18 has a mounting surface forming an angle of about forty-five degrees with respect to the longitudinal axis of the body. A filter 44 is attached to mounting plate 42 For illustrative purposes, the filter is preferably a VFF 30 Vacuum Fuelock-Filter manufactured by Impco Carburetion, Inc. A liquid fuel conduit 46 is connected to the fuel filter where the gas is filtered. Filter 44 is operated by vacuum connection 48.

The body also has a second integral mounting plate 50 having a mounting surface for low pressure gas converter 52. Preferably converter 52 is a Model L Converter manufactured by Impco Carburetion, Inc. Fuel from filter 44 is delivered through a conduit 54 to converter 52. Conduits 56 and 58 provide means for delivering water to the converter for vaporizing the fuel which is then delivered through a large conduit 60 to carburetor 38.

It is to be noted that the three major components of the system, the carburetor, the converter, and the fuel filter are all mounted on the same bracket so that they can be installed or removed as a unit from the engine. The converter and the fuel filter are mounted closely adjacent the air cleaner without the necessity of having a separate attachment to the engine. The bracket uses the existing fastener openings in the intake manifold used for mounting the original carburetor.

Preferably bracket 16 with mounting plates 42 and 50, flanges 20 and 24 and throat 22 are formed of a one-piece metal casting. However, they could be fabricated into a unitary structure as by welding or the like.

Figure 5:
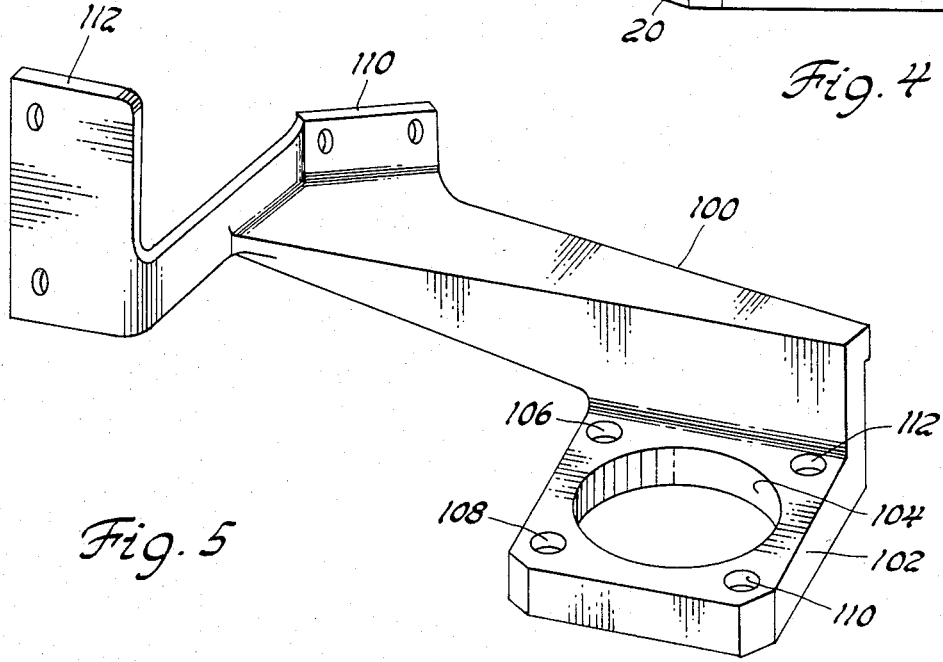
FIG. 5 is a view of another embodiment of the invention.

FIG. 5 illustrates another embodiment of the invention in the form of a bracket 100 having a flange 102 with a central opening 104 for passing fuel from the carburetor to the engine intake manifold. Flange 102 has four openings 106, 108, 110, and 112 for receiving threaded fasteners into the manifold openings used for attaching the original carburetor to the engine. Bracket 100 also has a mounting plate 110 and a mounting plate 112 disposed at the same angle with respect to the body as mounting plates 42 and 50 of the embodiment illustrated in FIGS. 3 and 4. The bracket can be made with either a long or a shorter length to accommodate different configurations, that is converters, filters, and air cleaners of larger or smaller sizes. In each case, the converter and the filter are mounted in a spaced relationship with respect to the mixer or carburetor to accommodate the diameter of the air cleaner.

Having described my invention, I claim:

1. In combination with a low pressure gas, internal combustion engine intake manifold having an opening for receiving a fuel and air mixture;

throat means having an opening, and fastener means for mounting the throat means on the intake manifold such that the throat opening is aligned with the intake manifold opening to pass a fuel and air mixture thereto;

a carburetor mounted on the throat means for delivering a fuel and air mixture through the throat means to the intake manifold;

an air cleaner having a generally cylindrical wall mounted on the carburetor such that the carburetor is substantially disposed within the air cleaner;

body means;

first mounting plate means carried by the body means, and second mounting plate means carried by the body means;

a low pressure gas converter mounted on the first mounting plate means, and conduit means for delivering low pressure gas from the converter to the carburetor;

fuel filter means mounted on the second mounting plate means in spaced relationship with respect to the gas converter, and conduit means connecting the fuel filter means to the gas converter;

the body means being supported adjacent the carburetor such that the gas converter and the fuel filter means are disposed adjacent the cylindrical wall of the air cleaner in spaced relationship to the throat means and the carburetor; and means forming a connection between the body means and the carburetor such that the body means, the throat means, the carburetor, the fuel filter and the converter are removable as a unit from the engine intake manifold.

2. In combination with a low pressure gas, internal combustion engine having an intake manifold having an opening;

bracket means including a bracket member having an opening, the bracket member being mounted on the engine such that the bracket opening is aligned with the intake manifold opening;

an air cleaner mounted on a carburetor above the intake manifold opening;

said carburetor being mounted within the air cleaner and onto the bracket member for delivering a fuel and air mixture through the bracket opening to the intake manifold;

a low pressure gas converter mounted on the bracket member in a spaced relationship with respect to the carburetor and adjacent the air cleaner, and conduit means for delivering low pressure gas from the converter to the carburetor;

fuel filter means mounted on the bracket means in spaced relationship with respect to both the gas converter and the carburetor but adjacent the air cleaner, wherein the bracket means, the carburetor, the converter and the fuel filter means are removable as a unit from the internal combustion engine; and said bracket means comprises an elongated body, a flange member integrally attached to and adjacent one end of the body and extending normal thereto, the flange member having fastener means for receiving fasteners for connecting the bracket body to the intake manifold, the flange member having an opening for passing a fuel and air mixture to the manifold from the carburetor;

a first mounting plate integrally attached to an opposite end of the body for mounting said converter extending in a direction same as and being spaced from said flange member; and a second mounting plate integrally attached to said opposite end of the body for mounting said fuel filter means extending in a direction away from said first mounting plate and bending toward said air cleaner.

3. A combination as defined in claim 2, in which the bracket means comprises a one-piece member.

4. A combination as defined in claim 2, in which the bracket means is formed of a one-piece metal casting.

* * * * *